(12) United States Patent
Bradley et al.

(10) Patent No.: US 7,892,455 B2
(45) Date of Patent: Feb. 22, 2011

(54) ELECTRICALLY-CONDUCTIVE COMPOSITION BASED ON A POLYAMIDE MATRIX

(75) Inventors: Gerard Bradley, Saronno (IT); Nicolangelo Peduto, Cesano Maderno (IT)

(73) Assignee: Rhodia Engineering Plastics S.r.l., Ceriano Laghetto (IT)

( * ) Notice: Subject to any disclaimer, the term of this patent is extended or adjusted under 35 U.S.C. 154(b) by 0 days.

(21) Appl. No.: 10/536,941

(22) PCT Filed: Nov. 27, 2003

(86) PCT No.: PCT/EP03/13360
§ 371 (c)(1), (2), (4) Date: Nov. 10, 2005

(87) PCT Pub. No.: WO2004/050763
PCT Pub. Date: Jun. 17, 2004

(65) Prior Publication Data
US 2006/0124906 A1 Jun. 15, 2006

(30) Foreign Application Priority Data
Nov. 29, 2002 (FR) .................. 02 15953

(51) Int. Cl.
*H01B 1/06* (2006.01)
*C08J 3/20* (2006.01)
*C04B 35/00* (2006.01)

(52) U.S. Cl. .................. 252/511; 523/351; 264/105

(58) Field of Classification Search .................. 252/500, 252/510, 511; 264/104, 105; 523/351
See application file for complete search history.

(56) References Cited

U.S. PATENT DOCUMENTS

| | | | | |
|---|---|---|---|---|
| 3,502,523 A | | 3/1970 | Ingalls et al. | |
| 4,173,556 A | * | 11/1979 | Coran et al. | 524/169 |
| 5,484,838 A | * | 1/1996 | Helms et al. | 524/496 |
| 5,843,340 A | * | 12/1998 | Silvi et al. | 252/511 |
| 5,844,037 A | * | 12/1998 | Lundgard et al. | 524/496 |
| 5,876,647 A | * | 3/1999 | Makise et al. | 264/105 |
| 5,959,069 A | | 9/1999 | Gluck et al. | |
| 6,221,283 B1 | * | 4/2001 | Dharmarajan et al. | 252/511 |
| 6,267,148 B1 | | 7/2001 | Katayama et al. | |
| 6,362,263 B1 | * | 3/2002 | Brown et al. | 524/267 |
| 6,409,942 B1 | | 6/2002 | Narkis et al. | |
| 7,022,776 B2 | * | 4/2006 | Bastiaens et al. | 525/391 |
| 2003/0134963 A1 | * | 7/2003 | Miyoshi et al. | 524/495 |
| 2005/0070657 A1 | * | 3/2005 | Elkovitch et al. | 524/495 |

FOREIGN PATENT DOCUMENTS

| | | |
|---|---|---|
| EP | 0 535 955 B1 | 4/1993 |
| EP | 0 632 703 B1 | 1/1995 |
| EP | 0 682 057 A1 | 11/1995 |
| EP | 0 866 098 B1 | 9/1998 |
| EP | 0 832 149 B1 | 7/2000 |
| FR | 2 743 077 | 7/1997 |
| FR | 2 779 730 | 12/1999 |
| WO | WO 99/03909 | 1/1999 |
| WO | WO 00/68298 | 11/2000 |

OTHER PUBLICATIONS

Technical Sheet No. 1261 for Degussa PRINTEX® XE2, PRINTEX® XE2-B, Derussol® NA 9 /XE2-B, Feb. 2005.
R. Gachter et al., Plastic Additives Handbook, 13.3.6 Bulk Conductivity, pp. 762-763, 1996.
Gachter et al., Plastic Additives, 4th Edition, pp. 501-505, Hanser, 1996.

* cited by examiner

*Primary Examiner*—Mark Kopec
*Assistant Examiner*—Jaison P Thomas
(74) *Attorney, Agent, or Firm*—Buchanan, Ingersoll & Rooney, P.C.

(57) ABSTRACT

The invention relates to a composition based on a polyamide matrix comprising electrically-conductive charges. Said composition can be prepared in order to produce plastic articles such as, for example, body parts in the automobile industry, having a good capacity for being painted using an electrostatic paint application method.

11 Claims, No Drawings

ELECTRICALLY-CONDUCTIVE COMPOSITION BASED ON A POLYAMIDE MATRIX

This application is an application under 35 U.S.C. Section 371 of International Application Number of PCT/EP2003/013360 filed on Nov. 27, 2003.

The present invention relates to a composition based on a polyamide matrix that includes electrically conductive fillers. By forming this composition it is possible to obtain plastic articles such as, for example, body parts for the automobile field, having a high capacity for being painted by an electrostatic paint deposition process.

In many industries, there is considerable demand for parts made of plastics. This is because parts made of plastics are light and can be designed and produced more easily than parts made of steel or aluminum, especially in the field of the automobile industry.

However, plastic parts pose problems when it is desired to paint them. Thus, for example in the automobile field, there are in particular three main methods of painting using an electrostatic process, that is to say by the movement of particles under the influence of an electrical current. The first, called the "inline" process, refers to a process in which the plastic part is assembled on the vehicle after the latter has undergone the degreasing and galvanizing steps followed by a drying step. The plastic part and the vehicle are then painted and dried by heating. The second process, called the "online" process, refers to a process in which the plastic part is assembled on the vehicle at the start of the abovementioned process. The plastic parts therefore undergo the degreasing, galvanizing and drying steps. Consequently, for this type of process, it is necessary for the plastic parts to be able to withstand higher temperatures, of around 180° C. In the third process, called the "offline" process, the plastic part is firstly painted before being assembled on the vehicle.

When electrostatic paint deposition processes are used, poor paintability is obtained in conventional plastic parts. This is because the paint easily tears and has little or no adhesion to the plastic parts.

To make the plastic parts capable of being painted by an electrostatic paint deposition process, it is known to add conductive fillers into the thermoplastic matrix. However, the incorporation of these fillers has a negative effect on the mechanical properties of the plastics.

Thus, there is a need to manufacture and use plastic parts having high mechanical properties, such as good impact strength, and good paintability using an electrostatic paint deposition process, especially at high temperatures.

The Applicant has provided a polyamide-matrix-based composition that includes electrically conductive fillers dispersed in a phase composed of impact modifiers. This composition makes it possible to form articles exhibiting a good balance of mechanical properties and paintability, especially by paint deposition using an electrostatic process.

The incorporation of electrically conductive fillers into the phase composed of impact modifiers makes it possible in particular for these fillers to be well dispersed in the polyamide-matrix-based composition. In addition, the incorporation of these fillers into the impact modifier makes it possible to limit shear-induced structural rupture of the final plastic parts, compared with plastic parts containing only such fillers added directly to the matrix.

In addition, it appears that the polyamide-matrix-based composition according to the invention has a significantly lower melt viscosity, compared with a composition obtained by separate addition of electrically conductive fillers and of impact modifiers into the matrix. The plastic parts according to the invention possess both good conductivity and consequently good paintability using electrostatic paint deposition, while still having an improved impact strength. The plastic parts according to the invention also have a linear thermal expansion coefficient (LTEC) that is particularly suitable for the automobile industry field. The plastic parts according to the invention also possess good thermal resistance, good surface appearance and good moldability.

These plastic parts are thus very well suited to painting processes, especially using inline, online and offline electrostatic processes used in the automobile industry.

The subject of the present invention is firstly a composition comprising at least one polyamide matrix and a dispersed phase composed of at least one impact modifier, the said dispersed phase containing at least one electrically conductive filler.

The polyamide composition may contain one or more types of electrically conductive filler and one or more types of impact modifier.

The presence of electrically conductive fillers within the dispersed impact modifier phase in the polyamide composition may be revealed and analyzed in various ways. In particular, the dispersed phase composed of impact modifiers may be dissolved using a selective solvent that does not dissolve the polyamide matrix. By recovering the dispersed phase composed of impact modifiers, it is possible to detect the presence in it of electrically conductive fillers, for example using a scanning microscope.

Preferably, the composition contains from 0.1 to 40% by weight, more preferably from 2 to 30% by weight and particularly from 5 to 15% by weight of electrically conductive fillers relative to the total weight of the composition.

Preferably, the composition contains from 0.1 to 70% by weight, more preferably from 5 to 40% by weight and particularly from 15 to 25% by weight of impact modifiers relative to the total weight of the composition.

Preferably, the dispersed phase comprises at least 90% by weight, more preferably 95% and particularly 100% of the electrically conductive fillers of the composition. In this case, the polyamide matrix contains little or no electrically conductive filler.

Preferably, the electrically conductive fillers are chosen from the group comprising: carbon black, a metal, an antistatic agent, graphite, glass and/or a mineral filler coated with a metal layer, and/or mixtures thereof.

The glass and/or the mineral fillers may be coated with a layer of metal, for example such as nickel or titanium.

The electrically conductive fillers may be in the following form: spheres, such as for example microspheres and/or nanospheres; tubes, such as for example microtubes and/or nanotubes; and/or fibers, such as for example microfibers and/or nanofibers. These fibers may be chopped and/or milled.

The antistatic agents may be chosen for example from polyetheramides, sodium alkylsulfonates, alkylbenzenesulfonates and ethoxylated amines.

Preferably, the electrically conductive fillers are chosen from the group comprising: carbon black; carbon fibers; carbon spheres or microspheres; carbon nanotubes; steel spheres, microspheres and/or fibers and/or aluminum spheres, microspheres and/or fibers; antistatic agents, such as polyetheramides.

The impact modifiers are preferably chosen from elastomers.

They may be chosen from the group comprising: ethylenepropylene copolymer (EP), ethylene-propylene-diene terpolymer (EPDM), elastomeric copolymers such as styrene/ maleic anhydride copolymers (SMA) for example, ultra-low-density polyethylene (ULDPE), linear low-density polyethylene (LLDPE), styrene/ethylene-butadiene/styrene copolymer (SEBS), polypropylene (PP), acrylic elastomers (such as polyacrylic elastomers), ionomer elastomers, acrylonitrile-butadiene-styrene terpolymer (ABS) and acrylic-styrene-acrylonitrile terpolymer (ASA). Optionally, the impact modifiers may include grafted groups, such as for example maleic anhydride groups. In particular, it is possible to use maleic anhydride grafted onto an ethylene-propylene-diene monomer terpolymer. The impact modifiers according to the invention may also be combinations, blends, homopolymers, copolymers and/or terpolymers of the above-mentioned compounds. The impact modifiers are chosen by a person skilled in the art for their compatibility with the polyamide matrix.

The composition according to the invention may also contain waxes, which may be chosen from stearamides, such as ethylene bis-stearamide and crodamide, stearic acid, polyethylenes (grafted or otherwise), zinc stearate, calcium stearate, manganese stearate and/or aluminum stearate.

The polyamide matrix may be composed of at least one polyamide chosen from the group comprising:

polyamides: 6; 6,6; 4,6; 6,10; 6,12; 11 and/or 12; or blends thereof;
 copolyamides: 6/6,6; 6/6,9; 6/6,10; 6/6,18 and/or 6/6,36; or blends thereof; and/or
 blends of polyamides: 6 and 6,6; 6 and 6/6,18; 6 and 6/6,36; 6 and 6/6,10; or blends thereof.

The composition may comprise one or more polyamides, for example as a blend or as a copolymer.

The polyamide matrix may also comprise thermoplastic polymers chosen from the group comprising: a polybutylene terephthalate (PBT), a polycarbonate (PC), a polyoxymethylene (POM), a polyvinyl chloride (PVC), a polyethylene terephthalate (PET), a polypropylene oxide (PPO), a polystyrene, a polymethyl methacrylate, a polyethylene (PE), a polypropylene (PP) and blends and copolymers based on these (co)polymers.

The polyamide matrix may especially be a polymer comprising star-shaped or H-shaped macromolecular chains, and, where appropriate, linear macromolecular chains. The polymers comprising such star or H molecular chains are, for example, described in documents FR 2 743 077, FR 2 779 730, U.S. Pat. No. 5,959,069, EP 0 632 703, EP 0 682 057 and EP 0 832 149.

According to another particular embodiment of the invention, the polyamide matrix of the invention may be a polymer of the random tree type, preferably a copolyamide having a random tree structure. These copolyamides of random tree structure and the process for obtaining them are described in particular in document WO 99/03909. The matrix of the invention may also be a composition comprising a linear thermoplastic polymer and a star, H and/or tree thermoplastic polymer such as those described above. The matrix of the invention may also comprise a hyperbranched copolyamide of the type of those described in document WO 00/68298. The matrix of the invention may also comprise any combination of linear, star, H and tree thermoplastic polymers or hyperbranched copolyamides, as described above.

It is also possible to add to the composition blends such as polyamide/acrylonitrile-butadiene-styrene terpolymer (PA/ABS), polyamide/polybutylene terephthalate (PA/PBT) or polyamide/polypropylene oxide (PA/PPO), for example.

The composition of the invention may also contain one or more additives normally used by those skilled in the art in thermoplastic compositions, especially those used for the manufacture of molded articles. Thus, examples of additives may include: heat stabilizers; fire retardants; molding agents, such as calcium stearate; UV stabilizers; antioxidants; lubricants; abrasion reducers; pigments and dyes; plasticizers; laser marking promoters; waxes; and toughness-modifying agents. By way of example, antioxidants and heat stabilizers are, for example, alkali halides, copper halides, stearically hindered phenolic compounds, organic phosphites and aromatic amines. UV stabilizers are generally benzotriazoles, benzophenones or HALS in combination with antioxidants.

The present invention also relates to a process for producing a composition according to the invention, which comprises at least the following steps:

a) blending at least one impact modifier with at least one electrically conductive filler, so as to obtain a masterbatch; and
 b) blending the masterbatch obtained in step a) with at least one polyamide matrix.

The electrically conductive fillers and the impact modifiers may be blended together by a continuous or batch mixing process using methods well known to those skilled in the art. To do this, a Banbury mixer may for example be used.

The process as defined makes it possible in particular to manufacture a composition having a good electrical conductivity and/or good paintability using an electrostatic paint deposition process.

The compositions of the invention are generally obtained by blending the polyamide matrix, the masterbatch according to the invention and optionally additives. This may be carried out by melt blending, for example in a single-screw or twin-screw extruder, or by blending without passing into the melt state, for example in a mechanical blender. The compounds may be introduced simultaneously or successively. All the means known to those skilled in the art regarding the introduction of the various compounds of a thermoplastic composition may be used. In general, an extrusion device is used in which the material is heated, subjected to a shear force and transferred. Such devices are very well known to those skilled in the art. The composition according to the invention, when it is produced using an extrusion device, may be packaged in granule form. The parts are then produced by melting the granules produced above and feeding the composition in the melt state into the appropriate molding, injection molding or extrusion devices. The parts may for example be molded articles.

The present invention also relates to the use of a composition as defined above for the manufacture of an article intended to be painted by an electrostatic paint deposition process. The composition according to the invention is particularly appropriate for the inline and online electrostatic painting processes used in the automobile industry.

The present invention also relates to a masterbatch intended to be incorporated into a polyamide-matrix-based composition and comprising at least one electrically conductive filler and at least one impact modifier.

The masterbatch may comprise from 20 to 60% by weight, preferably from 30 to 50% by weight and even more preferably from 35 to 40% by weight of electrically conductive fillers relative to the total weight of the masterbatch.

The masterbatch may comprise from 20 to 80% by weight, preferably from 40 to 70% by weight and even more preferably from 50 to 65% by weight of impact modifiers relative to the total weight of the masterbatch.

The thermoplastic polymers, the waxes and/or the various additives as mentioned above may be incorporated into the masterbatch that is intended to be incorporated into the polyamide-matrix-based composition.

The present invention also relates to an article obtained by carrying out a forming operation on a composition according to the invention. This article may for example be a granule or a formed article.

The articles according to the invention may for example be automobile parts, particular body parts, tubes intended for transporting fluids or gases, tanks, coatings, films and/or plastic tank covers.

Further details or advantages of the invention will become more clearly apparent in the light of the examples given below solely by way of indication.

EXAMPLE 1

Production of Masterbatches

Masterbatches comprising carbon black and an impact modifier were manufactured by blending and mixing the various compounds. The compounds used, their amounts and the masterbatches obtained are indicated in Table 1:

TABLE 1

| Masterbatch | Percentage (by weight) | Compounds |
|---|---|---|
| No. 1 | 62.5 | EPDM-MA (Fusabond ® MF 416D from DuPont) |
| | 37.5 | Conductive carbon black (Ketjenblack 300 ® from AKZO) |
| No. 2 | 56.3 | EPDM-MA (Fusabond ® 416D from DuPont) |
| | 6.2 | Polyacrylic elastomer (Hytemp ® 4053 from Zeon) |
| | 37.5 | Conductive carbon black (Ketjenblack 300 ® from AKZO) |
| No. 3 | 59 | Polyacrylic elastomer (Hytemp ® 4053 from Zeon) |
| | 35.2 | Conductive carbon black (Ketjenblack 300 ® from AKZO) |
| | 5.8 | Wax - Crodamide type (grade 212 from Ferroplast) |

All the percentages are by weight relative to the total weight of the masterbatch.
The EPDM-MA compound (Fusabond ® 416D from DuPont) corresponds to maleic anhydride grafted onto an ethylene-propylene-diene monomer terpolymer.

EXAMPLE 2

Production of Compositions

Polyamide-based compositions were manufactured by extruding the masterbatch and the polyamide matrix, using a twin-screw extruder. The compositions, the compounds used and their amounts are indicated in Table 2.

TABLE 2

| Compound | Composition 1 |
|---|---|
| PA-6,6 (Technyl ® 27 A00) | 47% |
| PA-6 (ASN 27 S) | 15% |
| RF-825 Mineral fiber | 10% |

TABLE 2-continued

| Compound | Composition 1 |
|---|---|
| Masterbatch No. 1 | 27% |
| Coloring additives and processing aid | 1.0% |

All the percentages are by weight relative to the total weight of the composition.
The compound PA-6,6 comprises a nylon-6,6 of 2.7 relative viscosity, sold by Rhodia Engineering Plastics under the brand name Technyl ® 27 A00.
The compound PA-6 corresponds to a nylon-6 of 2.7 relative viscosity, sold by Rhodia Engineering Plastics under the brand name ASN 27 S.

The relative viscosity was measured according to the ISO 307 standard using sulfuric acid as solvent.

The compound RF-825 mineral fiber corresponds to a mineral fiber sold by Lapinus.

The coloring additive is nigrosine and the processing aid is calcium stearate.

EXAMPLE 3

Measurement of the Adhesion of the Paint

Plastic parts based on the compositions mentioned in Example 2 were obtained by injection molding. The conditions were the following:

Mold temperature (° C.): 85

Barrel temperatures (° C.): 285, 290, 295, 300, 305, 305, 310

Hot runner temperatures (° C.) (4 zones): 300, 300, 300, 300

Injection time (s): 2.7

Hold time (s): 12

Injection pressure (bar): 120

Hold pressure (bar): 80

Total cycle time (s): 84.

The articles thus obtained were tested for their paintability using an electrostatic process according to various test methods, especially those grouped under Vehicle Standards B15 5050 from PSA (Peugeot Citroen).

The compositions were applied to car parts using an online painting process consisting of four main steps:

1) cataphoresis treatment for 30 mins at 205° C.;

2) surface cleaning using isopropyl alcohol;

3) primer application+30 minutes at 140° C.; and 4) paint application+30 minutes at 140° C.

Various properties were measured:

Adhesion: the initial adhesion after cross-cutting was measured according to the D25 1075 standard;

HPW: the measurement of the resistance of the paint to high-pressure washing (HPW) was measured according to the D25 5376 standard;

Bac Ford: the measurement of the moisture resistance (Bac Ford) was measured according to the test methods D27 1327 and D25 1075; and QCT: the QCT measurement, namely the resistance to moisture in the form of water drops (simulating rain), was measured according to the D25 1571 and D25 1075 standards.

The results are given in Table 3.

TABLE 3

|  |  | Adhesion (D25 1075) | HPW (D25 5376) | Bac Ford (D27 1327/ D25 1075) | QCT (D25 1571/ D25 1075) |
|---|---|---|---|---|---|
| Reference T5 range | Composition 1 | A (in spec.) | 0.0 (in spec.) | 0/a (in spec.) | 0/a (in spec.) |
| Direct DuPont SX primer | Composition 1 | A (in spec.) | 0.0 (in spec.) | 0/a (in spec.) | 0/a (in spec.) |

The tests were carried out using two types of paint:

the direct paint range Vernis Soudée from the Aulnay Peugeot factory. This comprised: the RAL 7021 series primer and the Santorin blue base and a varnish;

the DHAS (DuPoint&Herberts) direct paint range from the Sochaux Peugeot factory. This comprised the RAL 7021 series primer, the PPG EGE China blue base and a varnish.

EXAMPLE 4

Measurement of the Mechanical Properties

The mechanical properties of composition 1 were measured and these are indicated in Table 5.

Composition 1 corresponds to the composition of the abovementioned Example 2.

Comparative composition 2, mentioned in Table 4, contained the same type and the same proportion of polyamide, carbon and elastomer as composition 1. However, the conductive filler and the impact modifier were added separately into the polyamide matrix and not in the form of a masterbatch.

TABLE 4

| Compound | Composition 2 |
|---|---|
| PA-6,6 (Technyl ® 27 A00) | 47% |
| PA-6 (ASN 27 S) | 15% |
| RF-825 Mineral fiber | 10% |
| MA-grafted EPDM | 17% |
| Conductive carbon black | 10% |
| Coloring additives and processing aid | 1.0% |

TABLE 5

| Standard | Property | Composition 1 | Composition 2 |
|---|---|---|---|
| ISO 527 23° C. | Elongation at break | 22.5% | 3.3% |
| ISO 179/leA 23° C. | Notched Charpy impact | 12.7 kJ/m$^2$ | 3.5 kJ/m$^2$ |
| ISO 179/leU 23° C. | Unnotched Charpy impact | 102 kJ/m$^2$ | 44 kJ/m$^2$ |
| ISO 180/1A 23° C. | Notched Izod impact | 13.6 kJ/m$^2$ | 4.8 kJ/m$^2$ |
| ISO 180/1U 23° C. | Unnotched Izod impact | 87 kJ/m$^2$ | 38 kJ/m$^2$ |
| ISO 6603-2 | Weight drop | Ductile | Fragile |
| ISO 75 Be 0.45 N/mm$^2$ | Deflection temperature under load | 222° C. | 220° C. |
| IEC 93 | Surface resistivity | 10$^4$ ohms | 10$^4$ ohms |
| IEC 93 | Volume resistivity | 10$^3$ ohms/cm | 10$^3$ ohms/cm |

Thus it is apparent that composition 1 according to the present invention has better mechanical properties than composition 2 obtained by the separate addition of conductive fillers and impact modifiers into the polyamide matrix, and not in masterbatch form.

The invention claimed is:

1. A process for producing a composition consisting of:
   a continuous thermoplastic matrix comprising a polyamide, a copolyamide, a blend of polyamides, or a blend of copolyamides; and
   a discontinuous phase dispersed in the matrix comprising at least one impact modifier, said discontinuous phase containing at least one electrically conductive filler in an amount sufficient to provide the composition with a level of conductivity suitable for painting by a electrostatic technique;
   the process comprising the steps of:
   a) blending the at least one impact modifier with the at least one electrically conductive filler, so as to obtain a masterbatch; and
   b) blending the masterbatch obtained in step a) with the thermoplastic matrix.

2. The process as claimed in claim 1, wherein step a) comprises adding an amount of electrically conductive filler sufficient to constitute 0.1 to 40% by weight relative to the total weight of the composition.

3. The process as claimed in claim 1, wherein step a) comprises adding an amount of impact modifiers sufficient to constitute 0.1 to 70% by weight relative to the total weight of the composition.

4. The process as claimed in claim 1, wherein the electrically conductive fillers comprise: carbon black, a metal, an antistatic agent, graphite, glass or a mineral filler coated with a metal layer.

5. The process as claimed in claim 1, wherein the electrically conductive fillers comprise: carbon black; carbon fibers; carbon spheres, carbon microspheres; carbon nanotubes; steel spheres, steel microspheres, steel fibers, aluminum spheres, aluminum microspheres, aluminum fibers or polyetheramides.

6. The process as claimed in claim 1, wherein the impact modifier is an elastomer.

7. The process as claimed in claim 1, wherein the impact modifier is: ethylene-propylene copolymer (EP), ethylene-propylene-diene terpolymer (EPDM), styrene/maleic anhydride copolymers (SMA), ultra-low-density polyethylene (ULDPE), linear low-density polyethylene (LLDPE), styrene/ethylene-butadiene/styrene copolymer (SEBS), polypropylene (PP), acrylic elastomers (such as polyacrylic elastomers), ionomer elastomers, acrylonitrile-butadiene-styrene terpolymer (ABS) or acrylic-styrene-acrylonitrile terpolymer (ASA).

8. The process as claimed in claim 1, wherein the thermoplastic matrix comprises at least one polyamide chosen from polyamides: 6; 6,6; 4,6; 6,10; 6,12; 11 and/or 12; or blends thereof;

copolyamides: 6/6,6; 6/6,9; 6/6,10; 6/6,18 and/or 6/6,36; or blends thereof; and/or blends of polyamides: 6 and 6,6; 6 and 6/6,18; 6 and 6/6,36; 6 and 6/6,10; or blends thereof.

9. The process as claimed in claim 1, wherein at least 90% by weight of the electrically conductive filler is contained within the dispersed phase.

10. The process as claimed in claim 1, wherein at least 95% by weight of the electrically conductive filler is contained within the dispersed phase.

11. The process as claimed in claim 1, wherein step a) comprises adding an amount of electrically conductive filler sufficient to constitute 5% to 40% by weight relative to the total weight of the composition.

* * * * *